United States Patent [19]

Meyer et al.

[11] Patent Number: 5,045,519

[45] Date of Patent: Sep. 3, 1991

[54] PROCESS FOR THE PREPARATION OF A CATALYST CARRIER BASED ON ALUMINOSILICATES

[75] Inventors: Arnold Meyer, St. Michaelisdonn; Klaus Noweck, Brunsbuttel; Ansgar Reichenauer, Marne; Jurgen Schimanski, Brunsbuttel, all of Fed. Rep. of Germany

[73] Assignee: Condea Chemie GmbH, Brunsbuttel, Fed. Rep. of Germany

[21] Appl. No.: 407,863

[22] Filed: Sep. 15, 1989

[30] Foreign Application Priority Data

Nov. 24, 1988 [DE] Fed. Rep. of Germany ....... 3839580

[51] Int. Cl.$^5$ .......................... B01J 21/12; B01J 23/10
[52] U.S. Cl. ..................................... 502/235; 502/263
[58] Field of Search ................ 502/235, 263, 233, 240

[56] References Cited

U.S. PATENT DOCUMENTS

| | | | |
|---|---|---|---|
| 2,713,037 | 7/1955 | Kimberlin, Jr. | 502/235 |
| 2,809,169 | 10/1957 | Whiteley et al. | 502/235 |

FOREIGN PATENT DOCUMENTS

| | | | |
|---|---|---|---|
| 545682 | 9/1957 | Canada | 502/235 |
| 2166971 | 5/1986 | United Kingdom | 502/235 |

*Primary Examiner*—Carl F. Dees
*Attorney, Agent, or Firm*—Collard, Roe & Galgano

[57] ABSTRACT

The invention relates to a process for the preparation of a high-purity, thermally stable catalyst carrier based on aluminosilicate with 0.5 to 50% by weight $SiO_2$ by mixing an aluminum compound with a silicic acid compound in an aqueous medium, and subsequently drying or calcining the product obtained. The aluminum component used is a $C_2$ to $C_{20+}$ aluminum alkoxide hydrolyzed with water and purified by means of ion exchangers. Simultaneously or subsequently orthosilicic acid purified by means of ion exchangers is added to the aluminum compound.

6 Claims, 4 Drawing Sheets

PROCESS FOR THE PREPARATION OF A CATALYST CARRIER BASED ON ALUMINOSILICATES

BACKGROUND OF THE INVENTION

1. Field of the Invention

The invention relates to a process for the preparation of a high-purity, thermally stable catalyst carrier based on an aluminosilicate with 0.5 to 50% by weight of $SiO_2$ by mixing an aluminum compound with a silicic acid compound in an aqueous medium and subsequent drying or calcining of the product obtained.

2. Description of the Prior Art

Processes for the preparation of aluminosilicate are based either on the joint precipitation of silicic acid compounds and aluminum compounds in an aqueous medium, or on impregnation processes.

Thus, e.g. EP-A1-0 238,760 describes a process in which a $—Al_2O_3$ carrier is impregnated with a colloidal $SiO_2$ solution in water and is subsequently dried for a long time at temperatures above 120° C. In another process according to British patent 2,129,701 or European patent A3-0 190,883 alumina carriers are either contacted with a silane or with a water-dispersed polyorganosiloxane and subsequently calcined.

The aluminosilicates obtained according to this process are either unsatisfactory with regards to their high purity, particularly with regards to the presence of alkali metal and alkaline earth elements, or take a long time or are complicated to prepare and in particular do not make it possible to prepare high purity aluminosilicates, whose composition can be adjusted at random with regards to the $SiO_2$ content. The thermal stability of these catalyst carriers is also inadequate in many cases.

In the field of heterogeneous catalysis, high-purity catalyst carriers are required, whose sodium content is below 50 ppm $Na_2O$ and in which the sum of $Al_2O_3$ and $SiO_2$ is at least 99.95% by weight. According to the latest findings much greater significance is attached to the carrier substances for the active components, because the carrier not only permits a fine distribution of the active components over the surface and the ideal mass transport by means of specifically set pore structures, but, as a function of the pore size, $SiO_2$ content and acidity has synergistic effects with the catalytically active substances. This is particularly important with aluminosilicates and in the present case carrier materials with a greater tendency to amorphous structures or aluminum oxide crystal structures are involved rather than zeolites. With a view to the uses of catalyst carriers, such as desulphurization, dentrificaton, oxiation, hydrocracking, mild hydrocracking, exhaust gas detoxification and the various isomerization reactions, it is necessary to correspondingly adjust the aluminosilicates with regards to the acidity of and the $SiO_2$ content.

OBJECTS OF THE INVENTION

It is an object of the present invention to provide a process for the preparation of high-purity, thermally stable catalyst carriers of the aforementioned type, in which aluminosilicates of high chemical purity with a $SiO_2$ content of 0.5 to 50% by weight and a homogeneous distribution of the $Al_2O_3$ and $SiO_2$ are obtained, and preferably in a continuous manner, without any complicated subsequent treatments of the aluminas or the catalyst carriers produced therefrom being necessary.

This and further objects of the present invention will become more apparent as the description thereof proceeds.

SUMMARY OF THE INVENTION

It has surprisingly been found that when using aluminum alkoxides as the aluminum component and orthosilicic acid purified by means of ion exchangers as the $SiO_2$ supplier, excellent catalyst carriers are obtained if the aluminum alkoxide is hydrolyzed with water purified by means of ion exchangers, and simultaneously or subsequently, the orthosilicic acid, purified by means of ion exchangers, is then added.

The present invention will now be further described by reference to the following drawings.

DETAILED DESCRIPTION OF PREFERRED EMBODIMENTS

Figure 1:
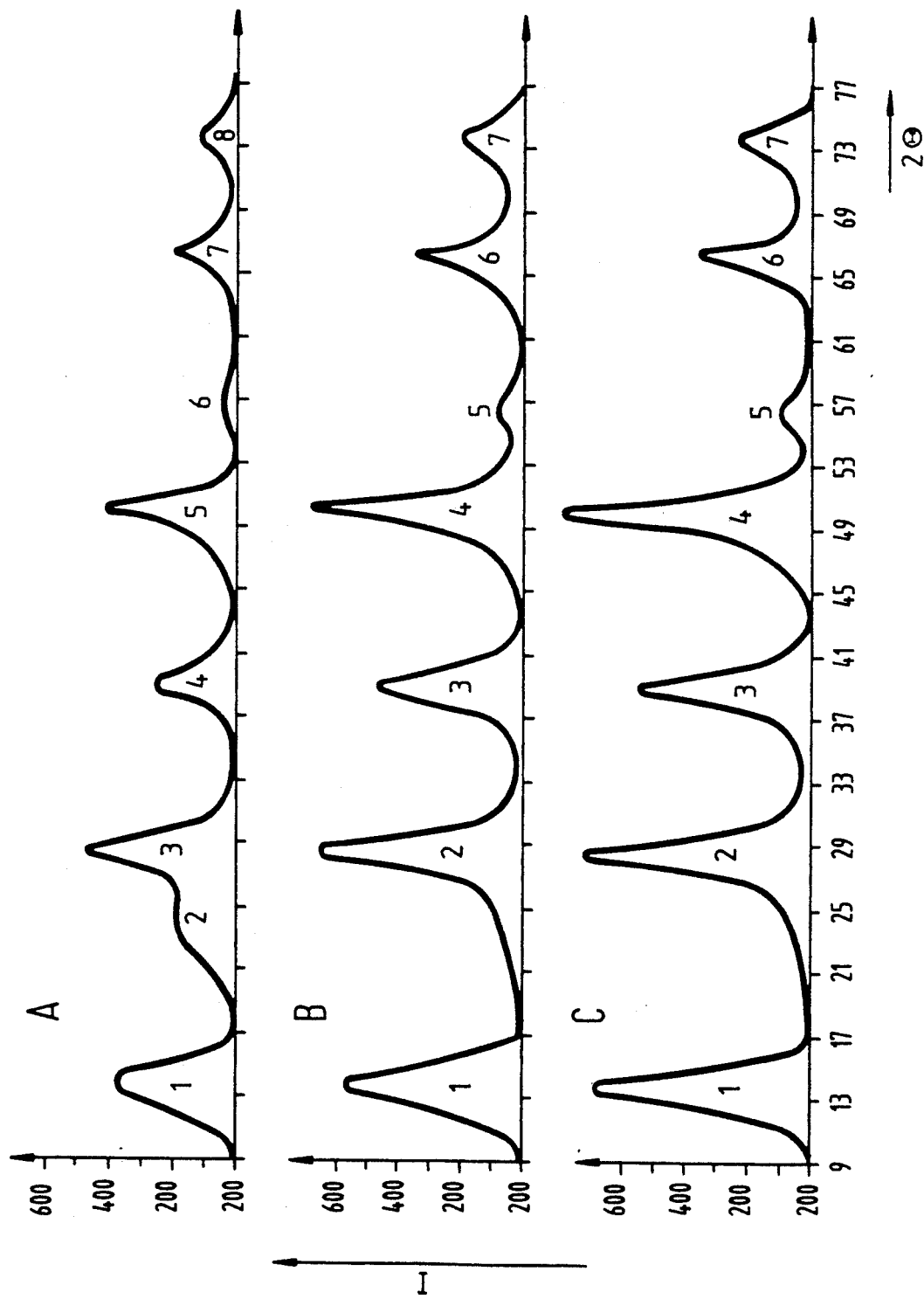
FIG. 1 shows X-ray diffractograms of three different aluminosilicates.

With regard to the process of the present invention, in both cases, catalyst carriers with a homogeneous distribution of the $Al_2O_3$ and $SiO_2$ are obtained, whose specific surfaces range between 300 and 520 $m^2/g$, as a function of the $SiO_2$ content and which have an excellent surface stability. The carriers obtained according to the process of the invention have, after treatment at 1100° C. and for 24 hours, a surface stability of at least 40 to 190 $m^2/g$, as a function of the $SiO_2$ content. The specific acidity is in a range of 5 to 40 mmole n-butyl amine per $m^2 \times 10^{-4}$ and the crystal structure is boehmitic to amorphous.

In addition, the chemical purity of the thus obtained catalyst carriers is excellent with regards to the $Na_2O$ content and is well below 50 ppm and in many cases below 10 ppm, also with carriers having a $SiO_2$ content up to 50% by weight. These carriers are surprisingly also extremely pure with respect to all the other elements otherwise occurring as impurities and particularly with regards to the alkali metal and alkaline earth elements and heavy metals and, based on the sum of $Al_2O_3$ and $SiO_2$ have a total purity above 99.95% by weight.

For use in the process according to the invention, the aluminum alkoxides are either used as mixed alkoxides, as occur during Ziegler alcohol synthesis with a carbon chain distribution of $C_2$ to $C_{20+}$, or as individual alkoxides, prepared from aluminum and alcohols, e.g. according to EP-A1-0 111,115.

The aluminum alkoxides are hydrolyzed either with water purified by means of ion exchangers, in which use is simultaneously made of orthosilicic acid purified by means of ion exchangers, preferably in a quantity of 0.1 to 5% by weight in the water of hydrolysis, or the alumina/water mixture obtained after hydrolysis with water purified by means of ion exchangers is mixed with the orthosilicic acid solution purified by means of ion exchangers and in a concentration of 0.1 to 5% by weight.

The admixing of the orthosilicic acid to the alumina/water mixture can either take place in a stirring reactor, e.g. according to DE-OS 3,823,895, with a simultaneously controlled modification to the crystal and pore size, or by so-called inline blending before, or after, a thermal treatment at 90° C. to 235° C.

According to a particularly preferred embodiment, together with or subsequent to the addition of the orthosilicic acid solution, a soluble lanthanum compound can be added, e.g. as a nitrate, acetate, chloride or some other soluble salt, so that it is possible to further increase the already high thermal stability. It is surprising that the combination of $SiO_2$ and lanthanum gives a much higher thermal stability than, in each case, the equivalent individual element addition. Preference is given to the addition of lanthanum in a quantity of 0.5 to 2.0% by weight, calculated as $La_2O_3$, which gives surprising results, especially in the case of aluminosilicates with a $SiO_2$ content of 0.5 to 2.0% weight.

The present invention will now be further illustrated by reference to the following examples, which are not to be deemed limitative of the present invention in any manner thereof.

EXAMPLE 1

45.0 kg of a mixed aluminum alkoxide with a carbon chain distribution of $C_2$ to $C_{20+}$ and an aluminum content of 6.0% by weight were hydrolyzed with 50 kg of deionized water at 90° C., within 15 to 60 minutes, continuously in a stirring reactor, the deionized water containing 3% by weight of orthosilicic acid deionized by means of ion exchangers.

The resulting solid suspension was subsequently dried in a spray drier in conventional manner at 300° to 600° C.

EXAMPLE 2

The procedure of Example 1 was repeated by hydrolyzing on the one hand at 70° C. and then on the other at 110° C.

EXAMPLE 3

The procedure of Example 1 was repeated, but the mixed aluminum alkoxide was hydrolyzed at 90° C. with deionized water after stirring for approximately 45 minutes in a stirring reactor. The aqueous alumina suspensions separating from the alcohols were then mixed with orthosilicic acid deionized by means of ion exchangers in a total quantity of 3% by weight. The solid suspension obtained was dried with a spray drier as in Example 1.

EXAMPLE 4

The procedure took place firstly in accordance with Example 1 and then in accordance with Example 3, but in each case in place of the mixed aluminum alkoxide, 45.0 kg. of aluminum trihexanolate with an aluminum content of 6.0% by weight were used. Hydrolysis firstly took place with deionized water and the simultaneous addition of a 3% by weight orthosilicic acid purified by means of ion exchangers and secondly with an addition of the orthosilicic acid to the alumina suspension obtained following hydrolysis.

The solid suspension was here again subsequently spray dried.

In all the processes according to Examples 1 to 4, by simply increasing the quantities of 3% orthosilicic acid it was possible to adjust the $Al_2O_3$:$SiO_2$ ratio in the catalyst carrier in an extremely simple manner and while retaining the alkoxide and water quantities used, as is shown by the following Table I.

TABLE I

Quantity ratios for preparing aluminosilicates with different $Al_2O_3$:$SiO_2$ ratios.

| Alkoxide 6% Al kg | Water kg | Orthosilicic Acid (3% $SiO_2$) kg | $Al_2O_3$:$SiO_2$ ratio |
|---|---|---|---|
| 45 | 50 | 2.7 | 98.5/1.5% |
| 45 | 50 | 9.0 | 95.0/5.0% |
| 45 | 50 | 19.0 | 90.0/10.0% |
| 45 | 50 | 42.5 | 80.0/20.0% |
| 45 | 50 | 73.0 | 70.0/30.0% |
| 45 | 50 | 113.0 | 60.0/40.0% |
| 45 | 50 | 170.0 | 50.0/50.0% |

The aluminosilicates prepared according to Examples 1 to 4 have the chemical and physical data appearing in Table II.

TABLE II

Chemical and physical data of aluminosilicates

| | | | | | | | | | |
|---|---|---|---|---|---|---|---|---|---|
| $SiO_2$:$Al_2O_3$ ratio (based on 100%) | % | 0.0/100 | 1.5/98.5 | 5.6/94.4 | 8.8/91.2 | 17.7/82.3 | 27.8/72.2 | 40.5/59.5 | 44.9/55.1 |
| Chemical characteristics | | | | | | | | | |
| aluminum oxide $Al_2O_3$ | % | 76.1 | 76.10 | 71.4 | 69.1 | 64.7 | 57.9 | 47.7 | 42.0 |
| silicon dioxide $SiO_2$ | % | <0.01 | 1.15 | 4.2 | 6.7 | 13.9 | 22.3 | 32.5 | 34.2 |
| Ignition loss 1h/1000° C. | % | diff. from 100% | | diff. from 100% | | diff. from 100% | | diff. from 100% | |
| sodium oxide $Na_2O$ | ppm | <10 | <10 | <10 | <10 | 35 | 49 | 16 | 21 |
| lithium oxide $Li_2O$ | ppm | <5 | <5 | <5 | <5 | <5 | <5 | <5 | <5 |
| magnesium oxide MgO | ppm | <10 | <10 | <10 | <10 | <10 | <10 | <10 | <10 |
| calcium oxide CaO | ppm | <10 | <10 | <10 | <10 | <10 | <10 | <10 | <10 |
| titanium oxide $TiO_2$ | ppm | <50 | <50 | <50 | <50 | <50 | <50 | <50 | <50 |
| ferric oxide $Fe_2O_3$ | ppm | 53 | 84 | 23 | 17 | 35 | 106 | 31 | 109 |
| sum of other elements Pb,Zn,Ni,Cr, | ppm | <50 | <50 | <50 | <50 | <50 | <50 | <50 | <50 |

TABLE II-continued

Chemical and physical data of aluminosilicates

| Cu,Mn,Mo,Ga Physical Characteristics | | | | | | | | | |
|---|---|---|---|---|---|---|---|---|---|
| crystal structure | | pseudoboehmite | | pseudoboehmite | | pseudoboehmite | | pseudoboehmite | |
| primary crystallite size (120 reflex) | nm | 5.2 | 5.0 | 5.0 | 4.6 | 5.0 | 5.0 | 4.8 | 4.6 |
| Surface* | m²/g | 248 | 300 | 361 | 378 | 406 | 453 | 492 | 458 |
| Surface stability: | | | | | | | | | |
| 24h/1050° C. | m²/g | 105 | 111 | 182 | 194 | 186 | 159 | 121 | 120 |
| 24h/1100° C. | m²/g | 13 | 96 | 139 | 149 | 149 | 129 | 91 | 94 |
| Pore volume distribution*#: | | | | | | | | | |
| 1.75–2 nm (radius) | ml/g | 0.01 | 0.01 | 0.03 | 0.03 | 0.04 | 0.04 | 0.03 | 0.05 |
| 1.75–3 nm | ml/g | 0.12 | 0.33 | 0.35 | 0.37 | 0.31 | 0.28 | 0.15 | 0.16 |
| 1.75–4 nm | ml/g | 0.43 | 0.47 | 0.49 | 0.53 | 0.44 | 0.38 | 0.20 | 0.21 |
| 1.75–5 nm | ml/g | 0.47 | 0.49 | 0.53 | 0.58 | 0.48 | 0.42 | 0.22 | 0.23 |
| 1.75–6 nm | ml/g | 0.47 | 0.50 | 0.55 | 0.60 | 0.50 | 0.43 | 0.23 | 0.23 |
| 1.75–8 nm | ml/g | 0.48 | 0.51 | 0.56 | 0.62 | 0.51 | 0.45 | 0.24 | 0.24 |
| 1.75–10 nm | ml/g | 0.49 | 0.51 | 0.57 | 0.63 | 0.52 | 0.48 | 0.25 | 0.25 |
| total pore volume*# (1.75–100 nm) | ml/g | 0.50 | 0.54 | 0.61 | 0.69 | 0.58 | 0.53 | 0.31 | 0.29 |
| Bulk density | g/l | 700 | 700 | 540 | 460 | 490 | 470 | 470 | 470 |
| Particle Size Distribution: | | | | | | | | | |
| <25 micron | % | 24.2 | 11.7 | 15.4 | 9.3 | 30.1 | 14.7 | 33.8 | 44.8 |
| <45 micron | % | 69.7 | 35.0 | 58.8 | 38.7 | 54.2 | 44.8 | 58.2 | 88.8 |
| >90 micron | % | 6.1 | 15.7 | 3.3 | 12.1 | 7.2 | 12.7 | 6.6 | <1.0 |
| spec. acidity * $10^{-4}$ (mmole/m²) (n-butyl amine; indicator:neutral red) | | 2.7 | 6.2 | 8.8 | 11.4 | 11.6 | 15.6 | 14.9 | 13.3 |

*3h/550° C.
Hg-penetration

Surprisingly, the X-ray diffractograms and electron transmission microscopic recordings of the catalyst carriers prepared according to the process variants of Examples 1, 3 and 4 are identical.

Using the X-radiation of electron microscopy, it was possible under the electron microscope to prove the substantially uniform element distribution of aluminium and silicon.

FIG. 1 shows typical X-ray diffractograms of three different aluminosilicates, namely:

Product A with 60% $Al_2O_3$ and 40% $SiO_2$,
Product B with 90% $Al_2O_3$ and 10% $SiO_2$,
Product C with 98.5% $Al_2O_3$ and 1.5% $SiO_2$.

They were present in boehmite form. The X-ray structure of the products corresponding to that of pseudoboehmite, the substance becoming more X-ray amorphous with increasing $SiO_2$ content.

In FIG. 1 on the ordinate is plotted the intensity I in counts per second×cm and on the abscissa the diffraction angle 2θ. The peaks given with 1 to 8 or 1 to 7 had the following values:

| | | Values: | |
|---|---|---|---|
| | Peak No. | Position (2 θ) | D (nm · $10^{-1}$) |
| Product A | 1 | 12.895 | 6.8600 |
| | 2 | 23.435 | 3.7929 |
| | 3 | 27.994 | 3.1847 |
| | 4 | 38.249 | 2.3512 |
| | 5 | 49.098 | 1.8540 |
| | 6 | 55.125 | 1.6647 |
| | 7 | 64.671 | 1.4402 |
| | 8 | 71.883 | 1.3124 |
| Product B | 1 | 13.320 | 6.6416 |
| | 2 | 28.086 | 3.1745 |
| | 3 | 38.342 | 2.3457 |
| | 4 | 49.193 | 1.8507 |
| | 5 | 55.109 | 1.6652 |
| | 6 | 64.744 | 1.4387 |
| | 7 | 71.965 | 1.3111 |
| Product C | 1 | 13.601 | 6.5050 |

-continued

| | Values: | |
|---|---|---|
| Peak No. | Position (2 θ) | D (nm · $10^{-1}$) |
| 2 | 28.119 | 3.1709 |
| 3 | 38.347 | 2.3454 |
| 4 | 49.163 | 1.8517 |
| 5 | 55.219 | 1.6621 |
| 6 | 64.705 | 1.4395 |
| 7 | 71.996 | 1.3106 |

Figure 2:
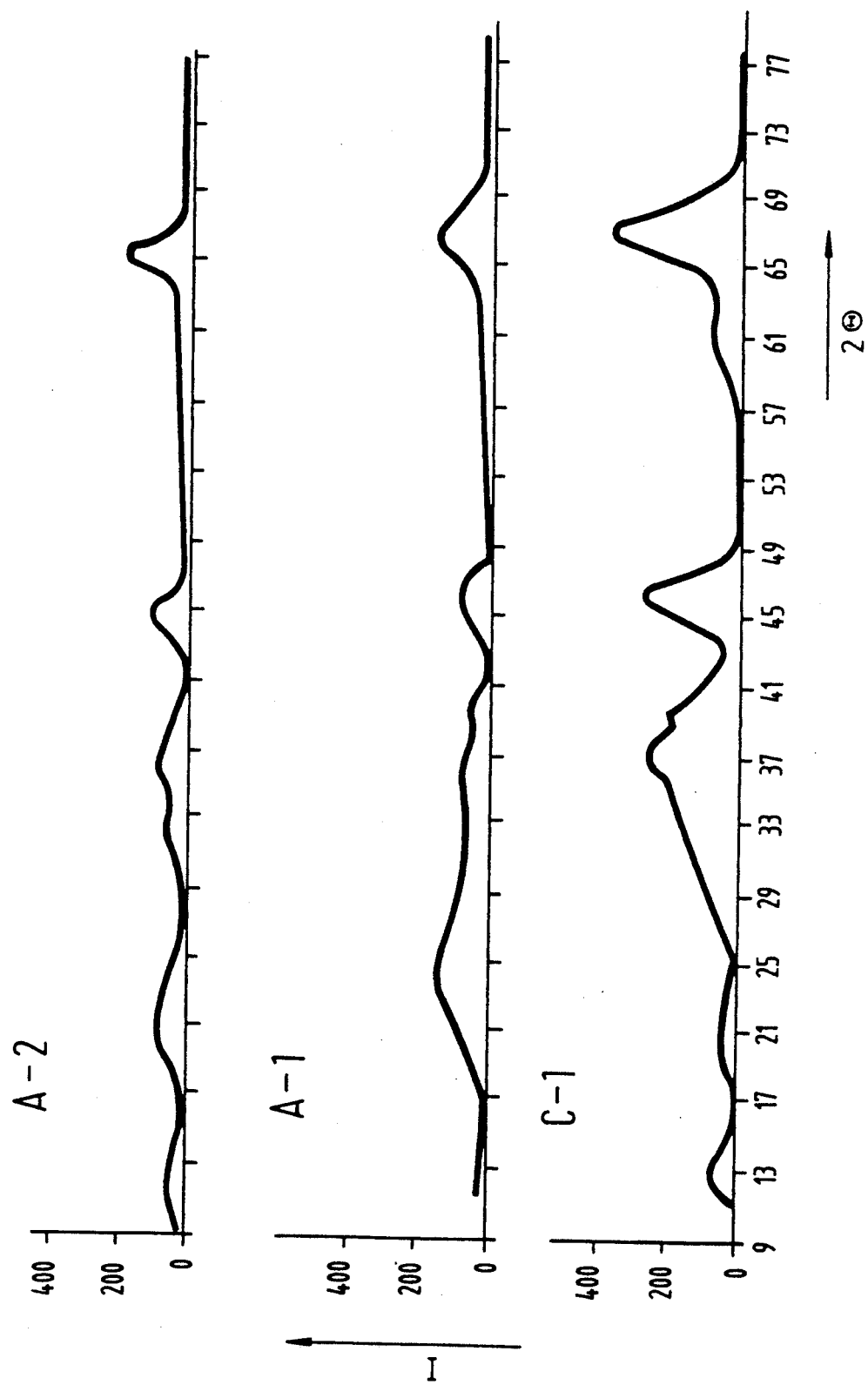
FIG. 2 shows the increase in the X-ray amorphous character of the aluminosilicates with increasing $SiO_2$ content.

The rise in the X-ray amorphous character accompanying the rising $SiO_2$ content is shown particularly clearly by FIG. 2 compared with pure $Al_2O_3$ (curve C-1), on activating the aluminosilicates, in the present case product A, for 3 hours at 550° C. (curve A-1) and 3 hours at 1050° C. (curve A-2).

Figure 3:
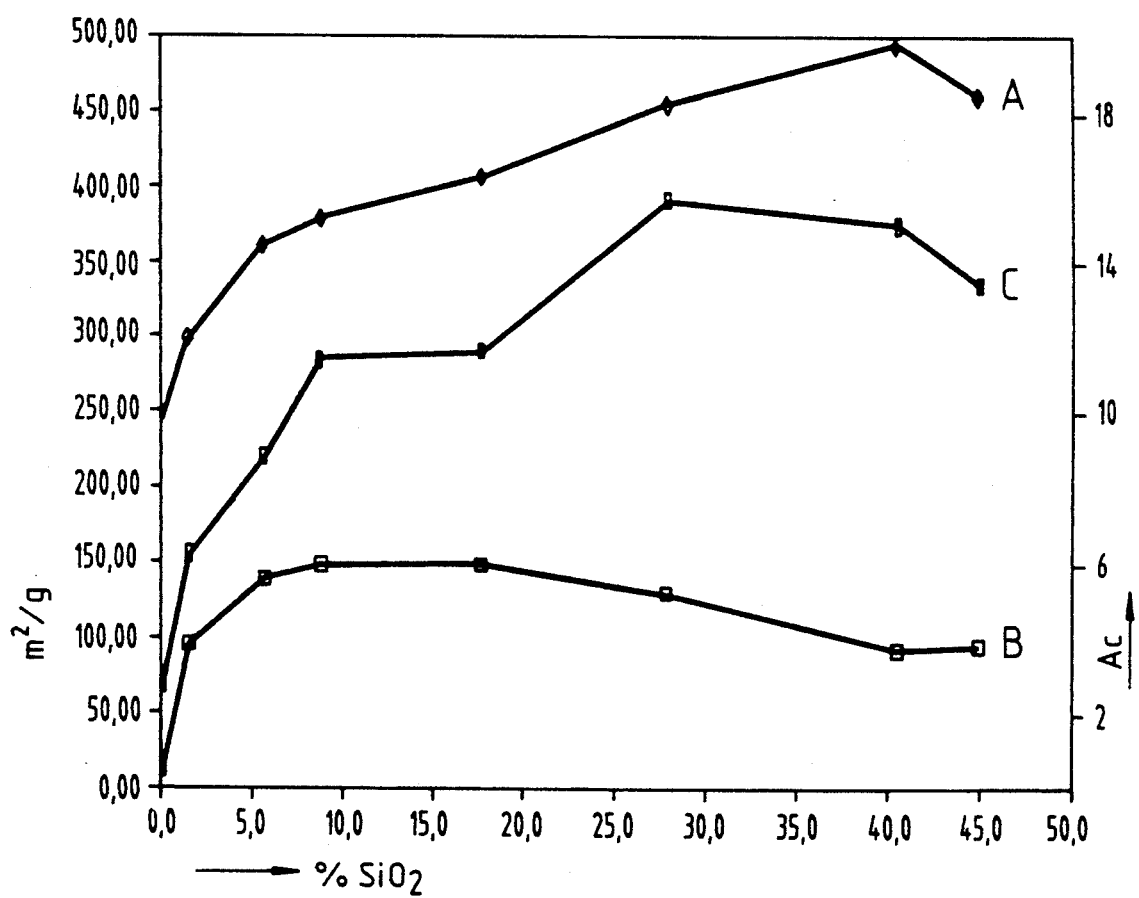
FIG. 3 shows the surface stability of the aluminosilicates as a function of the $SiO_2$ content.

FIG. 3 also shows the surface stability of the aluminosilicates as a function of the $SiO_2$ content as measured surface in m²/g of the aluminosilicates according to Example 1 in the case of activation for 3 hours at 550° C. (curve A) and activation for 24 hours at 1100° C. (curve B). The specific acidity Ac is given in curve C in values of mmole of n-butyl amine × $10^{-4}$/m².

EXAMPLE 5

As in Example 3, solid suspensions were prepared and doped with different orthosilicic acid quantities. The solid suspensions were subsequently thermally treated for, in each case, only 30 minutes at 90° C. and then dried in a spray drier as in Example 1.

Figure 4:
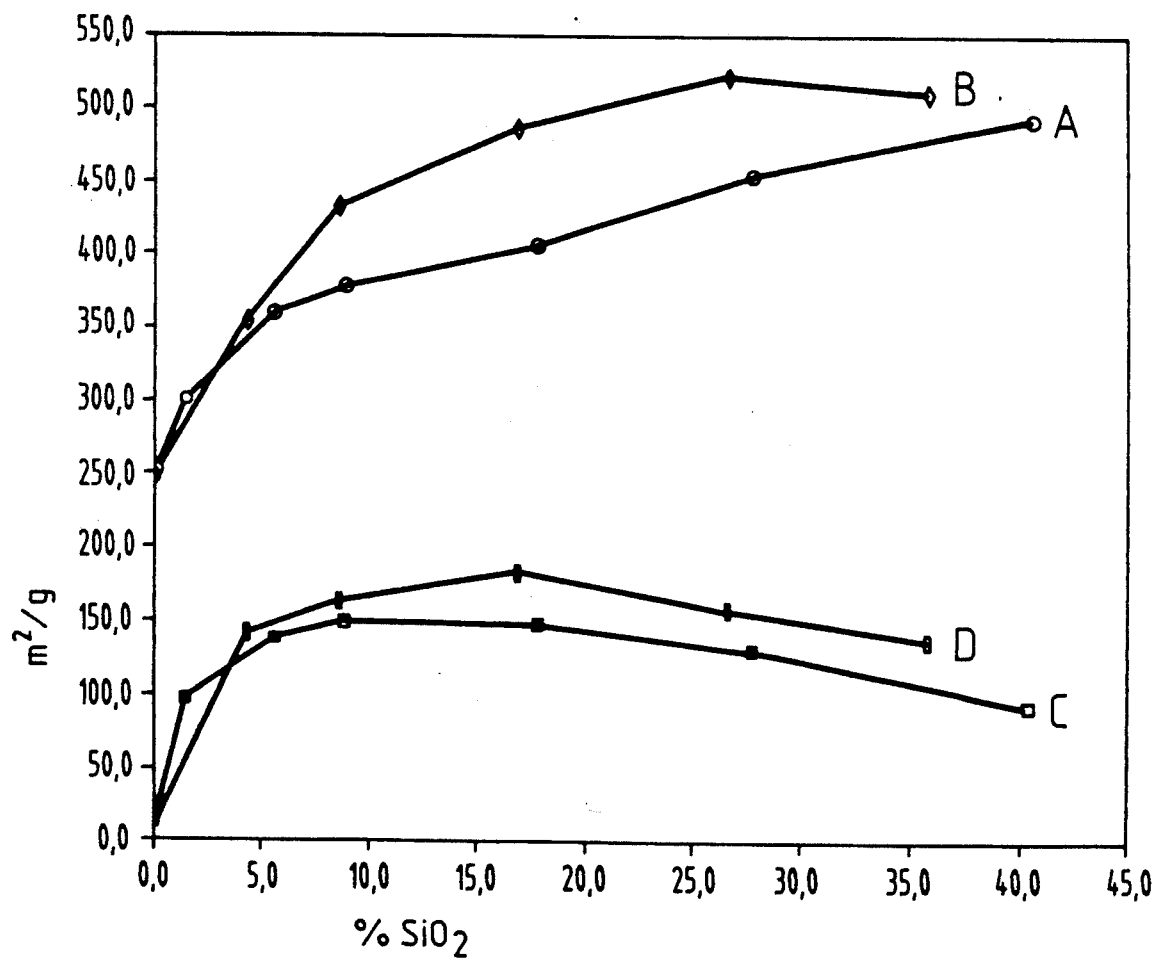
FIG. 4 shows the configurations of the surfaces of the aluminosilicates of Examples 3 and 5 as a function of the $SiO_2$ content.

Curves A to D of FIG. 4 shows the configuration of the surfaces of the aluminosilicates of Examples 3 and 5, as a function of the $SiO_2$ content, based on 100% solids and namely the aluminosilicates of Example 3 (curve A) and Example 5 (curve B), activated for 3 hours at 550° C. or the values in the case of a 24 hour activation at 1100° C. for the aluminosilicates of Example 3 (curve C) and Example 5 (curve D).

It is clear from the aluminosilicates prepared according to Example 5, that through the subsequent heat treatment of the solid suspensions mixed with orthosilicic acid up to 46m²/g higher surface values were obtained in the case of a treatment at 1100° C. for 24 hours than is the case in the process according to Example 3, as is apparent from the following Table III.

TABLE III

Comparison of the surfaces (3h/550° C. and 24h/1100° C.) of the aluminosilicates of Examples 3 and 5

EXAMPLE 3 (without subsequent heat treatment)

| % by weight $SiO_2$:% $Al_2O_3$ based on 100% | 0.0/100 | 1.5/98.5 | 5.6/94.4 | 8.8/91.2 | 17.7/82.3 | 27.8/72.2 | 40.5/59.5 |
|---|---|---|---|---|---|---|---|
| Surface (m²/g) (3h/550° C.) | 248 | 300 | 361 | 378 | 406 | 453 | 492 |
| surface (m²/g) (24h/1100° C.) | 13 | 96 | 139 | 149 | 149 | 129 | 91 |

EXAMPLE 5 (subsequent heat treatment: T = 90° C., duration 30 minutes)

| % by weight $SiO_2$:% $Al_2O_3$ based on 100% | 0.0/100 | — | 4.3/95.7 | 8.5/91.5 | 16.8/83.2 | 26.6/73.4 | 35.7/64.3 |
|---|---|---|---|---|---|---|---|
| surface (m²/g) (3h/550° C.) | 248 | — | 355 | 432 | 487 | 521 | 510 |
| surface (m²/g) (24h/1100° C.) | 13 | — | 141 | 164 | 184 | 159 | 137 |

EXAMPLE 6

Solid suspensions were prepared as in Example 1, then heat treated for 5 hours at 180° C. and dried in a spray drier at 380° C.

As is apparent from Table IV, in the case of the thus prepared aluminosilicates, there was a further increase in the surfaces with a 24 hour heat treatment at 1100° C. There was surprisingly a definite increase to the pore volume and specific acidity of the thus prepared aluminosilicates.

TABLE IV

Comparison of the surfaces (24h/1100° C.), of the pore volume and the specific acidity of the aluminosilicates of Examples 1, 5 and 6

Example 1 (without subsequent heat treatment)

| % by weight $SiO_2$:% $Al_2O_3$ based on 100% | 8.8/91.2 | 27.8/72.2 | 40.5/59.5 |
|---|---|---|---|
| $SiO_2$ % | 6.7 | 22.3 | 32.5 |
| surface (m²/g) (24h/1100° C.) | 149 | 129 | 91 |
| total pore volume (ml/g)* | 0.69 | 0.53 | 0.31 |
| spec. acidity · 10⁻⁴ (mmole n-butyl amine/m²) | 11.4 | 15.6 | 14.9 |

Example 5 (subsequent heat treatment: T = 90° C., duration 30 minutes)

| % by weight $SiO_2$:% $Al_2O_3$ based on 100% | 8.5/91.5 | 26.6/72.4 | 35.7/64.3 |
|---|---|---|---|
| $SiO_2$ % | 6.0 | 19.3 | 26.2 |
| surface (m²/g) (24h/1100° C.) | 164 | 159 | 137 |
| total pore volume (ml/g)* | 0.61 | 0.79 | 0.75 |
| spec. acidity · 10⁻⁴ (mmole n-butyl amine/m²) | 15.5 | 18.4 | 19.7 |

Example 6 (subsequent heat treatment: T = 180° C., duration 5 hours)

| % by weight $SiO_2$:% $Al_2O_3$ based on 100% | 11.7/88.3 | 25.8/74.2 | 39.7/60.3 |
|---|---|---|---|
| $SiO_2$ % | 8.7 | 20.3 | 31.6 |
| surface (m²/g) (24h/1100° C.) | 189 | 175 | 155 |
| total pore volume (ml/g)* | 1.02 | 1.19 | 1.55 |
| spec. acidity · 10⁻⁴ (mmole n-butyl amine/m²) | 21.5 | 37.3 | 33.0 |

*determined by Hg penetration in the range 1.75-100 nm on samples activated for 3 hours at 550° C.

' sample activated for 3 hours at 550° C. (indicator:neutral red)

EXAMPLE 7

As in Examples 1 and 3, aluminosilicates were prepared with a $SiO_2$ content of 0.5 and 1.0% by weight and initially during hydrolysis with orthosilicic acid-containing deionized water and later during the subsequent addition of orthosilicic acid to the alumina suspension 0.5 and 1.0% by weight of lanthanum nitrate, calculated as oxide was added. After drying, the powders had the surface stabilities given in the Table V, pure alumina serving as the comparison substance. The table shows that, compared with pure alumina, in the case of low $SiO_2$ contents, the surface stability rises synergistically through lanthanum addition.

TABLE V

Surface Stability of aluminosilicates after adding lanthanum

| Product Composition $Al_2O_3/SiO_2/La_2O_3$ % | Surface Stability (24h/1100° C.) m²/g |
|---|---|
| 100.0/-/- / | 7 |
| 99.5/0.5/- / | 42 |
| 99.0/1.0/- / | 60 |
| 99.0/0.5/0.5/ | 72 |
| 99.0/-/1.0/ | 29 |

EXAMPLE 8

On the basis of the aluminosilicates prepared according to Example 1 with a $SiO_2$ content of 10 or 40% by weight, the actual catalyst carriers were prepared in that 1500 g of the corresponding spray dried aluminosilicate were thoroughly mixed in an intensive mixer with 1250 g of 5% acetic acid for 45 minutes, subsequently approximately 2% by weight of cellulose ether were added as binder and the thus prepared paste was extruded to 1.5 mm extrudates by means of a single-shaft extruder. The compacts were then dried for about 3 hours at 120° C. and activated for a further 3 hours at 600° C. The extrudates obtained had the physical characteristics given the following Table VI.

TABLE VI

|  | 10% SiO$_2$ | 40% SiO$_2$ |
| --- | --- | --- |
| Crush strength | 110 N/extrudate | 110 N/extrudate |
| Pore volume (3h/600° C.) | 0.61 ml/g | 0.48 ml/g |
| Surface (3h/600° C.) | 369 m$^2$/g | 427 m$^2$/g |
| Surface Stability (24h/1100° C.) | 151 m$^2$/g | 93 m$^2$/g |

The above table shows that, apart from the chemical purity, the surface stabilities of the powders obtained according to Example 1 are also apparent in the pelletized catalyst carriers, while retaining good crush strengths and the excellent pore volume.

While the present invention has been illustrated by reference to a few embodiments thereof, the invention is not to be so limited; instead the present invention is to be defined only by the appended claims.

What is claimed is:

1. A process for the preparation of a high-purity, thermally stable catalyst carrier based on an aluminosilicate with 0.5 to 50% by weight SiO$_2$, comprising the steps of:
    mixing an aluminum compound with silicic acid compound in an aqueous medium, said aluminum compound used being a C$_2$ to C$_{20}$, aluminum alkoxide hydrolyzed with water purified by means of ion exchangers;
    simultaneously or subsequently adding orthosilicic acid purified by means of ion exchangers; and
    subsequently drying or calcining the product obtained, wherein the preparation process is selected from
    (A) mixing the alumina/water mixture obtained by neutral hydrolysis with a 0.1 to 5.0% by weight orthosilicic acid purified by means of ion exchangers in a stirring container, and subsequently heat treating the mixture at 90° C. to 235° C.; or
    (B) the alumina/water mixture obtained by neutral hydrolysis firstly undergoes heat treatment at 90° C. to 235° C.; and during or after this heat treatment, adding and subsequently stirring the orthosilicic acid solution with a concentration of 0.1 to 5% by weight purified by means of ion exchangers.

2. Process according to claim 1, comprising adding to the water of hydrolysis, from 0.1 to 5.0% by weight of an orthosilicic acid solution purified by means of ion exchanger.

3. A process for the preparation of a high-purity, thermally stable catalyst carrier based on an aluminosilicate with 0.5 to 50% by weight SiO$_2$, comprising the steps of:
    mixing an aluminum compound with silicic acid compound in an aqueous medium, said aluminum compound used being a C$_2$ to C$_{20}$, aluminum alkoxide hydrolyzed with water purified by means of ion exchangers;
    simultaneously or subsequently adding orthosilicic acid purified by means of ion exchangers; and
    subsequently drying or calcining the product obtained, wherein there is a
    mixing the alumina/water mixture obtained by neutral hydrolysis with a 0.1 to 5.0% by weight orthosilicic acid purified by means of ion exchangers in a stirring container, and subsequently heat treating the mixture at 90° to 235° C.

4. A process for the preparation of a high-purity, thermally stable catalyst carrier based on an aluminosilicate with 0.5 to 50% by weight SiO$_2$, comprising the steps of:
    mixing an aluminum compound with silicic acid compound in an aqueous medium, said aluminum compound used being a C$_2$ to C$_{20}$, aluminum alkoxide hydrolyzed with water purified by means of ion exchangers;
    simultaneously or subsequently adding orthosilicic acid purified by means of ion exchangers; and
    subsequently drying or calcining the product obtained,
    wherein the alumina/water mixture obtained by neutral hydrolysis firstly undergoes heat treatment at 90° to 235° C., and during or after this heat treatment, adding and subsequently stirring the orthosilicic acid solution with a concentration of 0.1 to 5% by weight purified by means of ion exchangers.

5. Process according to claim 1, wherein together with or after the addition of the orthosilicic acid solution, adding a soluble lanthanum compound in a quantity corresponding to 0.5 to 2% by weight La$_2$O$_3$ in the end product.

6. Process according to claim 1, comprising calcining the aluminosilicate for up to 24 hours at a temperature up to 1100° C.

* * * * *